(12) United States Patent
Liu et al.

(10) Patent No.: US 8,589,378 B2
(45) Date of Patent: Nov. 19, 2013

(54) TOPIC-ORIENTED DIVERSIFIED ITEM RECOMMENDATION

(75) Inventors: Peng Liu, Beijing (CN); Xianyu Zhao, Beijing (CN); Wei Li, Beijing (CN)

(73) Assignee: Yahoo! Inc., Sunnyvale, CA (US)

( * ) Notice: Subject to any disclaimer, the term of this patent is extended or adjusted under 35 U.S.C. 154(b) by 288 days.

(21) Appl. No.: 12/901,917

(22) Filed: Oct. 11, 2010

(65) Prior Publication Data

US 2012/0089621 A1    Apr. 12, 2012

(51) Int. Cl.
*G06F 7/00* (2006.01)

(52) U.S. Cl.
USPC ............ 707/708; 707/721; 707/749; 707/751

(58) Field of Classification Search
USPC ........................................................ 707/708
See application file for complete search history.

(56) References Cited

U.S. PATENT DOCUMENTS

| | | | |
|---|---|---|---|
| 2005/0165753 A1* | 7/2005 | Chen et al. ........................ | 707/3 |
| 2010/0094840 A1* | 4/2010 | Donnelly et al. ............ | 707/705 |
| 2010/0122182 A1* | 5/2010 | Bromenshenkel et al. ... | 715/745 |

* cited by examiner

*Primary Examiner* — Amy Ng
(74) *Attorney, Agent, or Firm* — James J. DeCarlo; Greenberg Traurig, LLP

(57) ABSTRACT

A content recommendation system and method are provided in which content semantic topic analysis, user interest identification and per interest recommendations are used to deliver relevant and diversified content recommendations to the user. Semantic topic analysis is used to infer underlying topics in content items; for each content item, a topic distribution vector is derived with components that represent relevance of the content item to specific underlying topics. A user's long term and short term user interests are identified using the user's browsing history. Long term user interest(s) can be obtained by a weighted aggregation of topic distribution vectors of content items the user accessed. Short term interest can be represented by the topic distribution vector corresponding to a current content item. Using identified user's interests, relevant content items are selected for recommendations for the user.

21 Claims, 6 Drawing Sheets

TOPIC-ORIENTED DIVERSIFIED ITEM RECOMMENDATION

FIELD OF THE DISCLOSURE

The present disclosure relates to topic-oriented item recommendation, and more particularly to making diversified item recommendation using topic-oriented analysis of content.

BACKGROUND

There are certain information needs underlying user browsing behaviors on a content rich network. A content recommendation system aims to satisfy user's information needs with high quality recommendations. However, a recommendation system is limited in the number of recommendations that can be presented to the user. There is therefore a tradeoff between relevance of the results and diversity. Marginal relevance is related to redundancy, e.g. even if a news article is highly relevant to user's interest, its information could be redundant to other suggestions and hence have little if any relevance. Redundant suggestions diminish a user's experience and impact the user's satisfaction with the recommendation system.

Conventionally, recommendation systems operate in two separate stages. In a first stage, documents are retrieved based on relevance criteria. In a second and separate stage, the retrieved documents are clustered into several dissimilar groups. Recommendation results are then selected from these distinct groups to diversify the presented information. There are several problems with such a two-stage approach. For example, the clustering must be performed on every retrieval set, which results in significant computational overhead on the online recommendation service. As another example, many factors affect the online clustering process and its output, e.g. the number of clusters, the cluster sizes, stopping criterion, etc., all of which affect the final information presented. As yet another problem, clustering-based diversification and relevance ranking is usually carried out without considering the inherent multitude of user information needs and interests.

SUMMARY

The present disclosure seeks to address failings in the art and to provide a topic-oriented content feed, or content item, recommendation system, method and architecture.

In accordance with one or more embodiments, content recommendation systems and methods are provided in which content semantic topic analysis, user interest identification and per interest recommendations are used to deliver relevant and diversified content recommendations to the user. Semantic topic analysis is used to infer underlying topics in content item; for each content item, a topic distribution vector is derived with components that represent relevance of the content item to specific underlying topics. Based on topics in content items identified in a user's content item browsing history, the user's long term and short term user interests are identified. Long term user interest(s) can be obtained by a weighted aggregation of topic distribution vectors of content items the user accessed. Short term interest can be represented by the topic distribution vector corresponding to a current content item, e.g., a web page being displayed by a browser at the user's computer. A topic-based inverted index can be used as an index for a collection of content items, with each topic acting as a key to a corresponding relevance value stored in the index. For a recommendation, using identified user's interests, relevant content items are selected in a per interest manner, e.g., iterating through user's interest in a descending order of its strength and using each interest as query to retrieve content items for the user.

Advantageously and in accordance with one or more embodiments, the burden of online clustering processing can be shifted to a robust offline topic analysis on content items. In accordance with one or more embodiments, a plurality of topics of interest to a user are identified, and a diverse set of recommendations are identified to match the user's plurality of interests on a per interest retrieval manner.

In accordance with one or more embodiments, a method comprises relating, using at least one computing system, each content item in a plurality of content items with a plurality of topics, each content item being related to each topic by a relevance value reflecting a strength of relationship between the topic and the content item; identifying, using the at least one computing system, topics of interest to a user, the topics of interest being identified from a content item browsing history of the user; identifying, using the at least one computing system, a set of content items as recommendations for the user by iterating through the topics of interest to the user to identify a set of content items, each content item in the set having a relevance determined using the strength of relationship between the topic and the content item; and ranking, using the at least one computing system, the set of content items based on the relevance of each content item in the set.

A system in accordance with one or more embodiments comprises at least one processor and memory, the memory storing instructions that when executed by the at least one processor cause the at least one processor to relate each content item in a plurality of content items with a plurality of topics, each content item being related to each topic by a relevance value reflecting a strength of relationship between the topic and the content item; identify topics of interest to a user, the topics of interest being identified from a content item browsing history of the user; identify a set of content items as recommendations for the user by iterating through the topics of interest to the user to identify a set of content items, each content item in the set having a relevance determined using the strength of relationship between the topic and the content item; and rank the set of content items based on the relevance of each content item in the set.

In accordance with one or more embodiments, a computer readable storage media is provided for tangibly storing thereon computer readable instructions that when executed, cause at least one processor to relate each content item in a plurality of content items with a plurality of topics, each content item being related to each topic by a relevance value reflecting a strength of relationship between the topic and the content item; identify topics of interest to a user, the topics of interest being identified from a content item browsing history of the user; identify a set of content items as recommendations for the user by iterating through the topics of interest to the user to identify a set of content items, each content item in the set having a relevance determined using the strength of relationship between the topic and the content item; and rank the set of content items based on the relevance of each content item in the set.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides a block diagram showing components used in accordance with one or more embodiments of the present disclosure.

DETAILED DESCRIPTION

Figure 1:
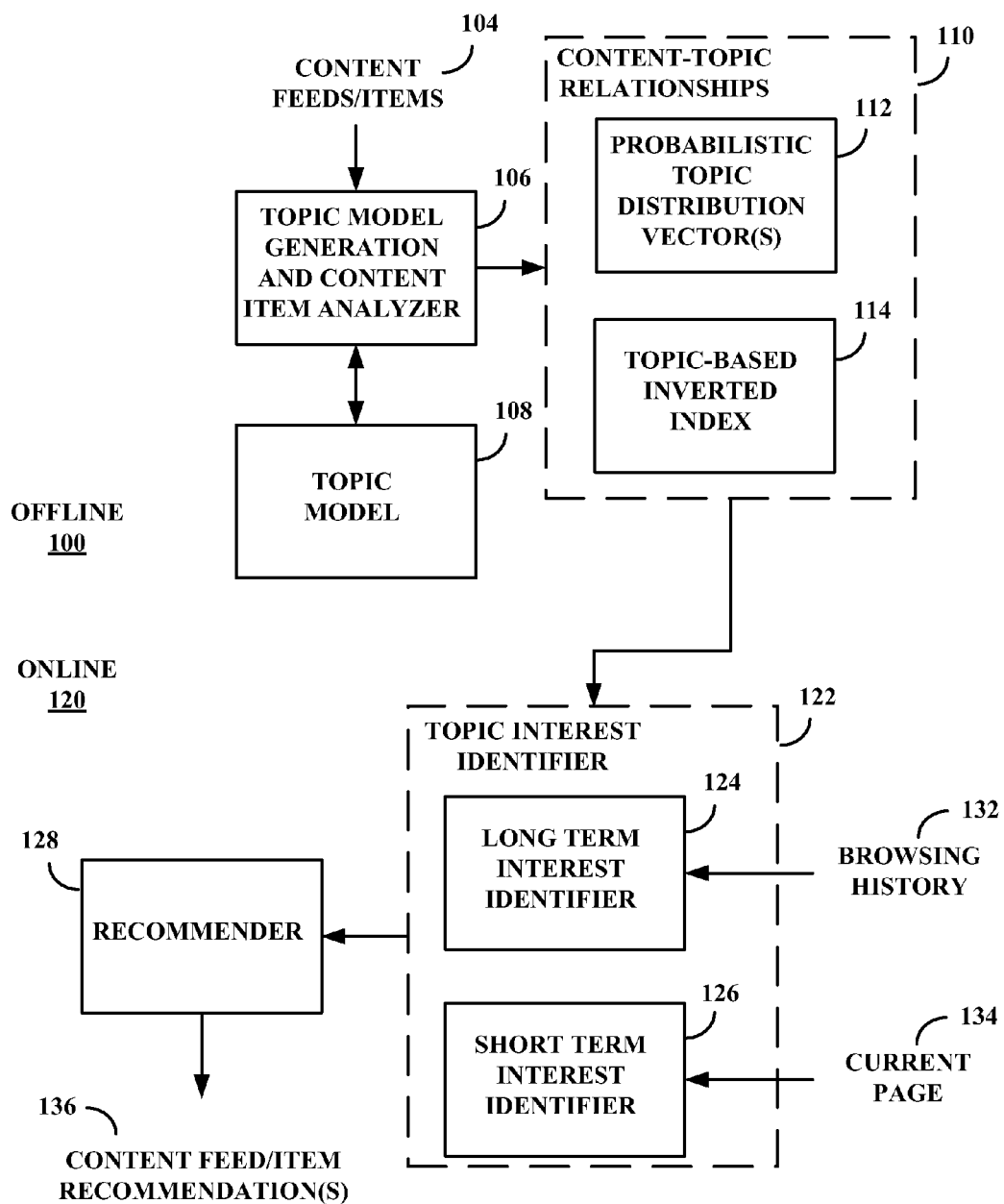

In general, the present disclosure includes a topic-oriented content feed, or content item, recommendation system, method and architecture. Certain embodiments of the present disclosure will now be discussed with reference to the aforementioned figures, wherein like reference numerals refer to like components.

In accordance with one or more embodiments, topic-oriented content item recommendations are made, and provide relevant and diverse content to users. FIG. 1 provides a block diagram showing components used in accordance with one or more embodiments of the present disclosure. Embodiments of the present disclosure include offline 100 and online 120 processing. In accordance with offline 100 processing, items of content, such as web pages, documents, audio, video, multimedia content, etc., are analyzed, by analyzer 106, e.g., using a topic model generator component of analyzer 106, to identify correspondences between topics and tokens found in content items 104 and generate a topic model 108. Additionally, in offline 100 processing, analyzer 106, e.g., using a content item analyzer component of analyzer 106, analyzes one or more content items 104 to identify one or more topics for the content item 104. In the example shown in FIG. 1, analyzer 106 comprises a topic model generator and a content item analyzer. It should be apparent that the topic model generator and the content item analyzer can be separate components.

In online 120 processing, content item recommendations can be identified for a user based on topics identified, by topic identifier 122, based on user action(s), e.g., current browsing 134 and long term web browsing history 132. In accordance with one or more such embodiments, topics identified for the user can be used to make recommendations, e.g., by a recommender 128 system or component that provides content item recommendations 136. The content item recommendations 136 can be transmitted to a user's computer and displayed as a list in a web page by a browser at the user's computer, for example. By way of some non-limiting examples, a user is provided with item recommendations such as, without limitation, movies, music, books, multimedia, television shows, plays, news articles, web pages, images, products, services, etc., based on topics identified using short and long term content item browsing.

In accordance with one or more embodiments, in offline 100 processing, analyzer 106 generates a topic model 108 using training data input to analyzer 106. In accordance with one or more embodiments, the training data includes information about a plurality of content items 104, such as and without limitation, for each content item 104, tokens found in the content item 104. In accordance with at least one embodiment, a token can be a word, such as a word that has undergone proper stemming and lemmatization processing. In at least one embodiment, each content item 104 can be considered to be an unordered container of "tokens". By way of one non-limiting example, a news article can contain a number of tokens.

In accordance with at least one embodiment, analyzer 106 uses the training data to generate topic model 108. By way of a non-limiting example, analyzer 106 can use latent Dirichlet allocation (LDA) to infer a set of topics over a pool of content items 104. It should be apparent that techniques other than LDA, such as probabilistic latent semantic analysis (PLSA), a joint user interest/content analysis, etc., can be used in place of LDA. In a topic model 108, the tokens most relevant to one topic can be different from the tokens most relevant to another topic. By way of one non-limiting example, a given token can belong to a highly relevant set of tokens for a given topic, where each token in the set has a high probability of being found in a content item 104 in a case that the content item 104 has a relationship with the topic.

By way of a further example and without limitation, using the training data, analyzer 106 applies LDA to derive a probabilistic correspondence between topics and tokens. In accordance with one or more such embodiments, a probabilistic correspondence for a given topic and token identifies the probability that there is a correspondence between the token and the topic, and probabilistic correspondence relationships can be stored as topic model 108. For example and without limitation, there may be significant probabilistic correspondence relationships between tokens such as "power", "plant", "light", "solar", "electricity", "coal", "water", "dam", etc., and a topic about "energy"; while for a "criminal" topic, tokens such as "charge", "arrest", "police", "guilty", "plead", "investigation", "attorney" might have significant probabilistic correspondence relationships. In accordance with at least one embodiment, a frequency of occurrence of each token found in a content item 104 is used to identify a probabilistic correspondence relationship between the content item 104 and each token found in content item 104.

In accordance with one or more embodiments, topic model 108 can be used on content item or feed 104, e.g., a content item 104 other than the content items 104 used to train model 108, to infer one or more topics associated with the content item 104. By way of one non-limiting example, the analyzer 106 identifies the topics(s) associated with a content item 104 based on occurrences of tokens found in the content item 104 and the probabilistic correspondences between topics and token defined by topic model 108. In accordance with one or more embodiments, the analyzer 106 automatically identifies a set of topics and generates topic models for them in an unsupervised manner. In accordance with one or more embodiments, if the content items 104 have some categorical label information, such information can be applied in an analysis process to guide the generation of topics and topic models, although such label information is not mandatory. In accordance with one or more such embodiments, analyzer 106 identifies relationships 110 between content items 104 and topics. By way of one non-limiting example, analyzer 106 generates a probabilistic topic distribution vector 112 for a content item 104. Each vector 112 corresponds to a content item 104, and comprises a component for each of the topics. A topic's component in the content item's 104 vector 112 identifies the strength of the relevance of the topic to the content item 104. In accordance with at least one embodiment, the component strengths of vector 112 are normalized strengths, such that all of the component strengths are positive and sum to one. In accordance with one or more embodiments, the topic distribution vector is clipped against a predefined threshold to remove small components therein.

In accordance with one or more embodiments, a topic-based, or topic-oriented, inverted index 114 can be generated and maintained, to facilitate topic-based content recommendation and retrieval, e.g., by recommender 128. In the index 114, topics are used as keys, and each key, or topic, has an associated list of content items, e.g., relevant content items 104, and a topic relevance strength for each associated content item 104. The relevance strength can be extracted from the probabilistic topic distribution vector 112, e.g., from a corresponding position, or component, in the content item's probabilistic topic distribution vector 112, and stored as information for each item of the topic's associated list of content items.

In accordance with one or more embodiments, content-topic relationships 110 become input to a topic identifier 122 of online 120 processing. In accordance with one or more embodiments, a long term browsing history 132, which comprises a history of user browsing within a predefined time window, is used, by long term interest identifier 124, to derive the user's long term topic interest(s). Short term interest identifier 126 uses a short term browsing, e.g., the current browser page 134, to derive the user's short term topic interest(s). For each topic identified by topic identifier 122, a value representing an interest weight is identified. The interest weight is derived from the probabilistic topic distribution vector(s) 112 corresponding to each of the content items 104 identified in one or both of browsing history 132 and current page 134. In one embodiment, user's long term content item browsing history 132 is represented as a plurality of records with each record corresponding to a particular content item 104, e.g., a browsing action such as a request for a content item for viewing via a browser. By way of one non-limiting example, each record in browsing history 132 includes a content item 104 identifier, or ID, identifying the content item 104 and a timestamp to represent a time of the browsing action. By way of one non-limiting example, the time can be used to identify when a user viewed the content item 104, and whether browsing of the content item 104 by the user falls within the predefined time window.

In accordance with one or more embodiments, a user's long term interest profile can be constructed from browsing history 132. In accordance with one or more embodiments, topic interest identifier 122 generates a long term user interest profile identifying at least one topic using browsing events from browsing history 132 and a short term user interest profile identifying at least one topic using current page 134; each topic identified in a user interest profile has a numeric value representing the user's interest in the topic. In accordance with one or more embodiments, the numeric value is determined using the relevance values associated with the one or more content items 104 identified from long term browsing history 132, short term browsing history 134, or both.

By way of one non-limiting example, a user's long term interest in a topic comprises a value determined for the topic using the topic's strength of relevance value, or relevance, associated with one or more content items 104 identified in browsing history 132. Where a topic is associated with more than one content item 104 identified in browsing history 132, the user's interest is aggregated across all of the content items 104 identified in the browsing history 132 and related to the topic, e.g., as indicated in each content item's 104 vector 112. By way of one non-limiting example, in a case that topic A is associated with three content items 104 identified in the browsing history 132, the strength of relevance of the topic associated with topic A in each of the three content item's 104 vector 112 is identified and aggregated to derive the user's long term interest in the topic. In accordance with one or more embodiments, the strength of relevance of the topic can be weighted in accordance with the time of the browsing event associated with the content item 104. The weight can be set in an exponentially time-decaying manner, e.g., use a weighting that places a greater emphasis on more recent browsing events, or actions. A user's short term interest, e.g., current page 134, can be represented by the topic distribution vector of the content page that the user is currently viewing, e.g., being displayed by a browser on the user's computer.

In accordance with one or more embodiments, the topics identified in the long term and short term user topic interest profiles are input to recommender 128. Recommender 128 iterates through the topics identified as being of interest to the user to identify content item recommendations 136 for the user. In accordance with one or more embodiments, the topics identified as being of interest to the user are ordered based on their weights, e.g., from greater interest to least interest, and the recommender 128 iterates through the ordered topics to identify content item recommendations 136 for the user. As is described in more detail below, in accordance with one or more embodiments, a content item 104 is selected that best represents a topic identified as being of interest to the user. By way of one non-limiting example, the content item 104 is selected that has the greatest strength of relevance associated with the topic, as identified by content-topic relationships 110, e.g., topic-based inverted index 114.

Figure 2:
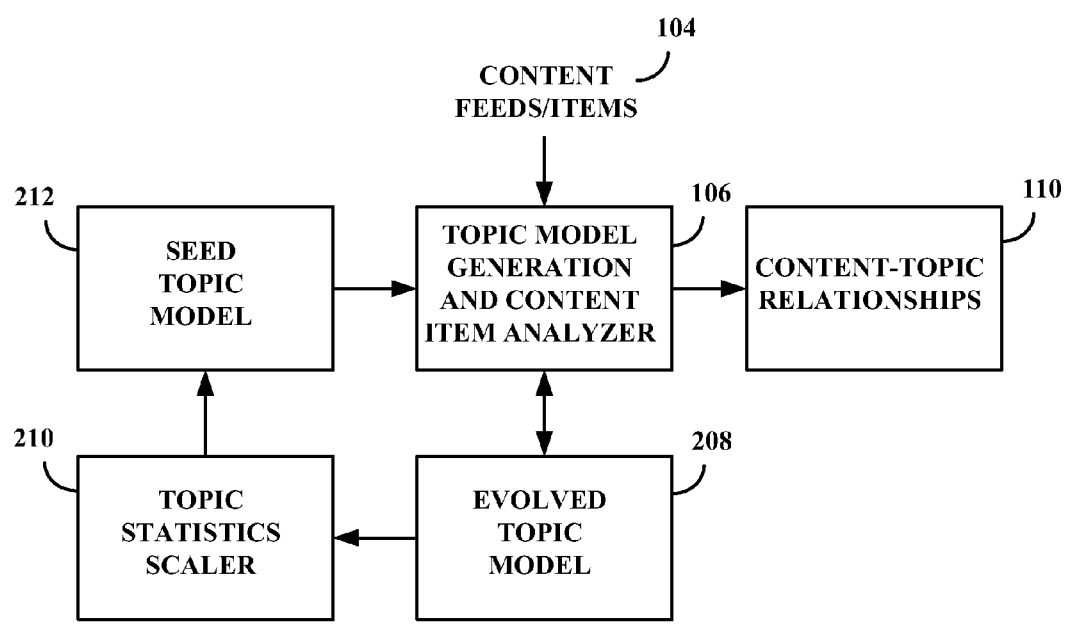
FIG. 2 illustrates a topic analysis with an evolving topic model in accordance with one or more embodiments of the present disclosure.

In accordance with one or more embodiments, the topic model 108 can be modified by the analyzer 106 to account for temporal drift or evolution of topics with new content items 104. FIG. 2 illustrates a topic analysis with an evolving topic model in accordance with one or more embodiments of the present disclosure. In accordance with one or more embodiments, to track the temporal drift or evolution of topics over new content feeds, e.g., newly-arriving content items and/or content items other than those used to train the topic model, the probabilistic correspondences between topics and tokens, or historic count statistics, are discounted by a factor, $\alpha$, by topic scaler 210 to yield seed topic model 212. The seed topic model 212 and the new content items 104 are used by analyzer 106 to generate the evolved topic model 208, which is used by analyzer 108 to update the content-topic relationships 110.

Figure 3:
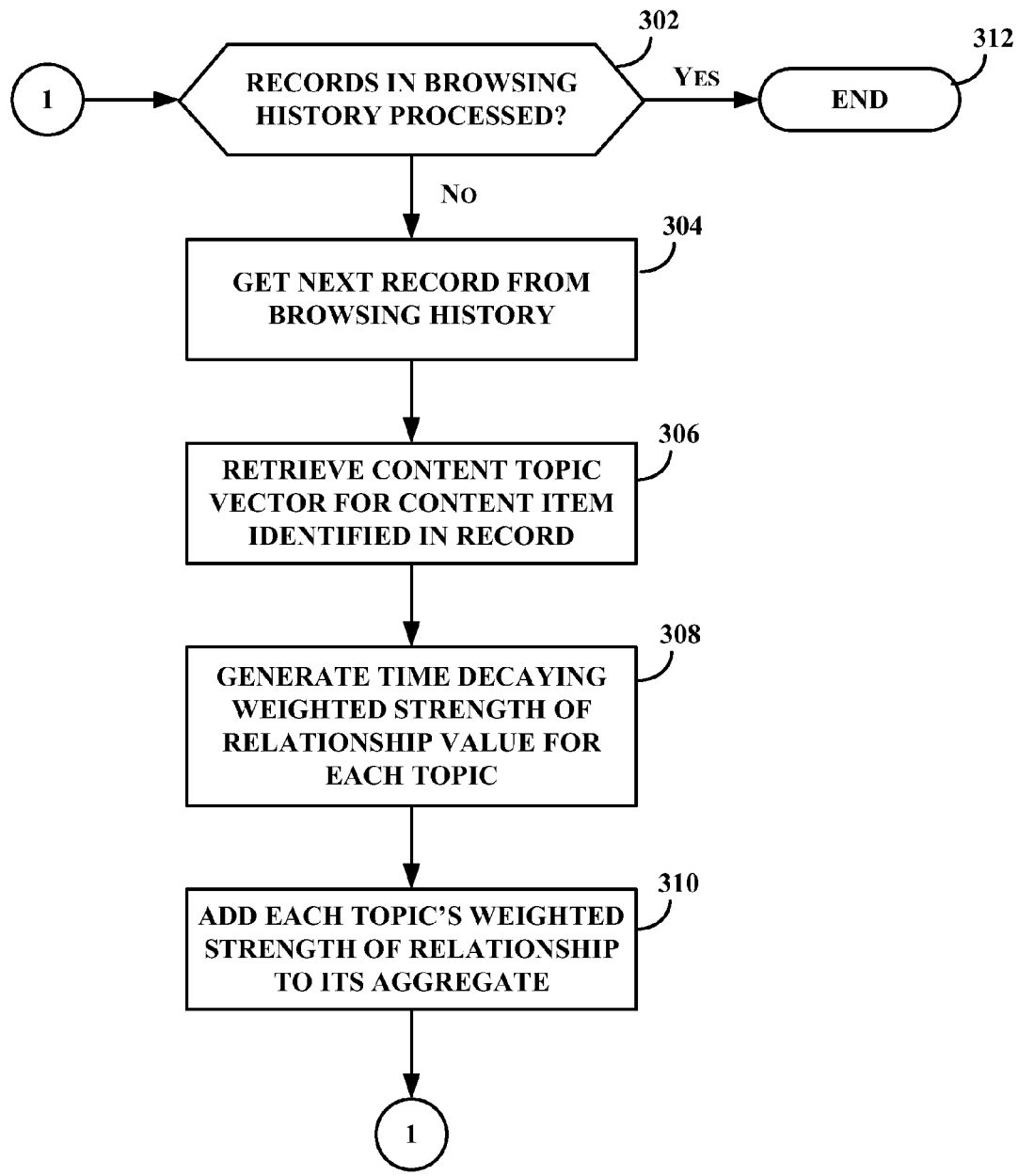
FIG. 3 illustrates a process of identifying user's long term interests using the user's content browsing history in accordance with one or more embodiments.

FIG. 3 illustrates a process of identifying user's long term interests using the user's content browsing history in accordance with one or more embodiments. In accordance with one or more embodiments, user content browsing history within a predefined time window is used to derive the user's long term interests. In at least one embodiment, user's content browsing history is represented as a list of records with each record for a particular action. Each record stores a content item 104 ID and a timestamp to represent what a user views at a given time. User's long term interests profile is then constructed as a weighted aggregation of topic distribution vectors for the content items 104 identified in the content browsing history. In accordance with one or more embodiments, the weight can be set in an exponentially time-decaying manner, e.g., placing more emphasis, or weight, on more recent browsing events, with the influence of an event occurring more recently being greater than an event occurring less recently.

Referring to FIG. 3, a determination is made at block 302 whether or not all of the records in the browsing history 132 have been processed. In a case that a predefined time window is desired, it is assumed that the browsing history 132 comprises records having time stamps within the predefined time window. If it is determined that there are records in browsing history 132 remaining to be processed, processing continues at step 304 to get the next record from the browsing history 132. At block 306, the vector 112 corresponding to the record, e.g., the vector 112 having a content item 104 ID that matches the record's content item 104 ID, is retrieved. At block 308, a time-decaying weighted strength of relationship value is generated for each of topic's strength of relationship identified in the vector 112 retrieved at block 306. By way of one non-limiting example, the weight is based on a timing of the event, as indicated by the record's time stamp. At block 310, each topic's weighted strength of relationship is added to an aggregate or cumulative weighted strength of relationship for the topic. Processing continues at step 302 to process any remaining records in browsing history 132. If there are no remaining records in browsing history 132 to be processed, processing ends at block 312. In accordance with one or more embodiments, the aggregate strength of relationship values for topics associated with content items 104 identified by the browsing history 132 are used as the user's long term interest profile, and the user's long term interest profile includes information identifying one or more topics and a relevance for each identified topic.

In accordance with one or more embodiments, user's short term interest is derived using the topic distribution vector 112 of the current page 134, the page being displayed by a browser at the user's computer. In accordance with one or more embodiments, the user's short term interest profile includes information identifying one or more topics and a relevance for each identified topic. In accordance with one or more embodiments, the vectors 112 are filtered using the content item 104 ID of the current page 132, and the current page's 132 vector 112 is used to determine the user's current, or short term, interest profile. For each topic, its corresponding numeric value in the vector 112 is used in user interest profile as the user's interest in the topic based on the current page 134. By way of a non-limiting example, the current page 134 has a content item 104 ID that can be used to identify the vector 112 corresponding to the current page 134. The strength of relationship for each topic identified in the vector 112 is used as the user's current interest in the topic.

Figure 4:
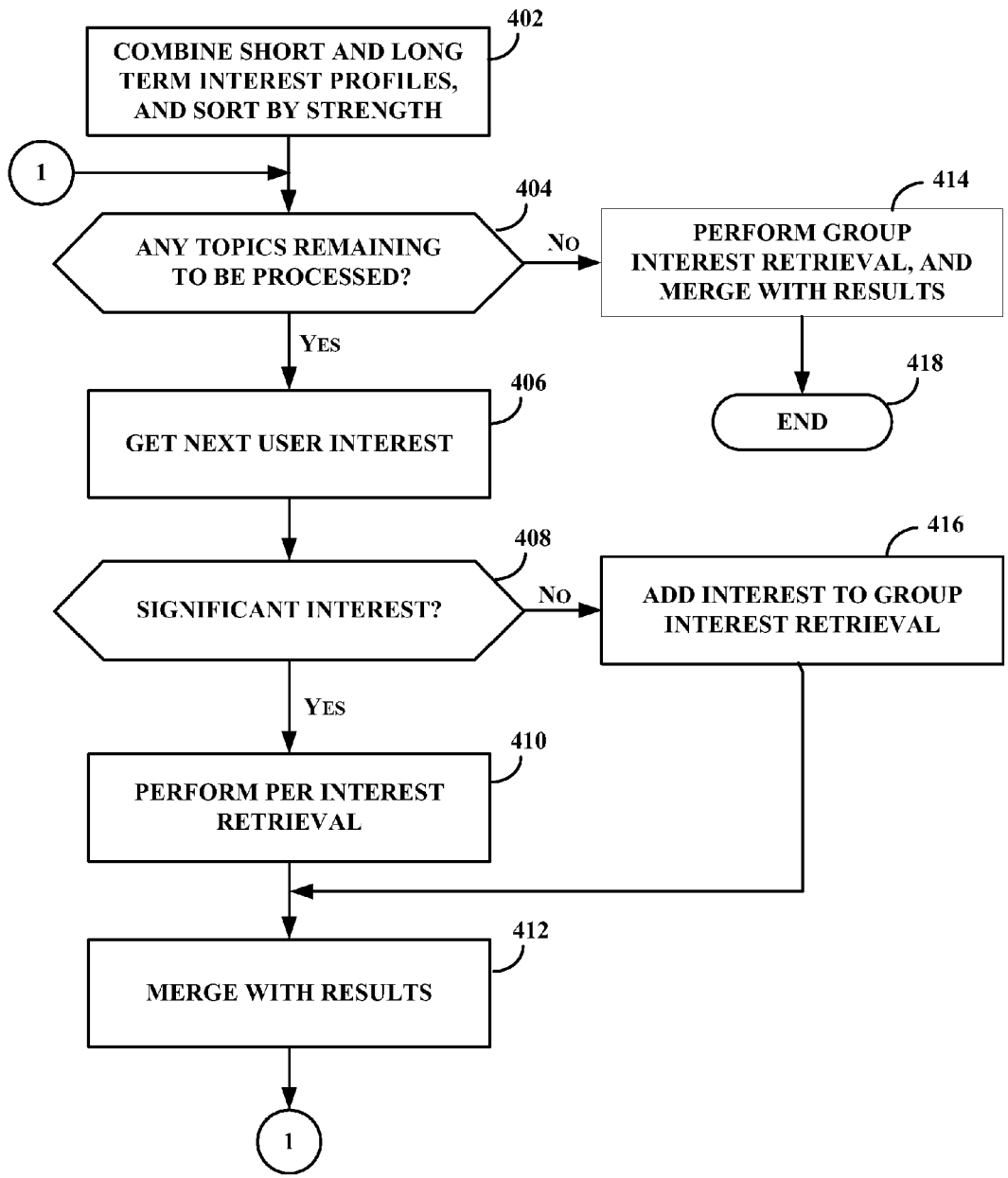
FIG. 4 illustrates a process of making content recommendations to match user's interests in accordance with one or more embodiments.

FIG. 4 illustrates a process of making content recommendations to match user's interests in accordance with one or more embodiments. At block 402, the user's short and long term interest profiles are combined to yield a set of topics, each topic including a strength of relationship value that reflects the aggregate strength of relationship from the long term interest profile and the strength of relationship from the short term interest profile. The topics are sorted using their corresponding strength of relationship values identified in the user's short term and long term interest profiles.

At block 404 a determination is made whether or not any topics remain to be processed. If there are topics remaining to be processed, processing continues at block 406 to retrieve the next topic of interest to the user. By way of a non-limiting example, a topic's value in the combination of the profiles reflects the user's interest in the topic. By ordering the topics by their corresponding values, greatest value, or interest to least value, or interest, block 406 iterates through the topics of interest to the user from the topic that has the greatest interest of the user to the topic that has the least interest to the user. Ordering the topics of interest to the user in this manner results in the process shown in FIG. 4 iterating from the most intense interest to the least one.

At block 408, a determination is made whether or not the user's interest in the topic is significant enough, e.g., at least equal to a predefined significance threshold. If so, processing continues at block 410, at which the topic is used as query into the topic-based index 114 to retrieve a number of relevant content items 104 for the topic. In accordance with one or more embodiments, in the per-interest retrieval, the retrieved content items 104 are ranked according to relevance, where the relevance ranking is based on the topic's strength of relationship value associated with each of the retrieved content items 104.

If it is determined, at block 408, that the user's interest in the topic is not significant, e.g., is less than the predefined significance threshold, processing continues at step 416, to add the topic of interest to a group of topics used to perform a group interest retrieval. In accordance with at least one embodiment, the topics of interest to the user that have an associated value that falls below the significance threshold are grouped together and used in an additional retrieval to return corresponding recommendation results using the topic (s) in the group as a query into the topic-based index 114. In accordance with one or more such embodiments, a relevance score for each content item 104 retrieved is evaluated using a cosine similarity between the interests in the interest group, e.g., leaving out the topics/interests for which per-interest retrieval is performed, and content item's topic distribution vector.

All recommendation results from the above process are merged, and duplicates removed. In accordance with one or more embodiments, additional ranking can be performed, e.g., ranking that takes into account recency, authority, popularity, etc., to determine an order of presentation of the recommendations 136 for the user.

Figure 5:
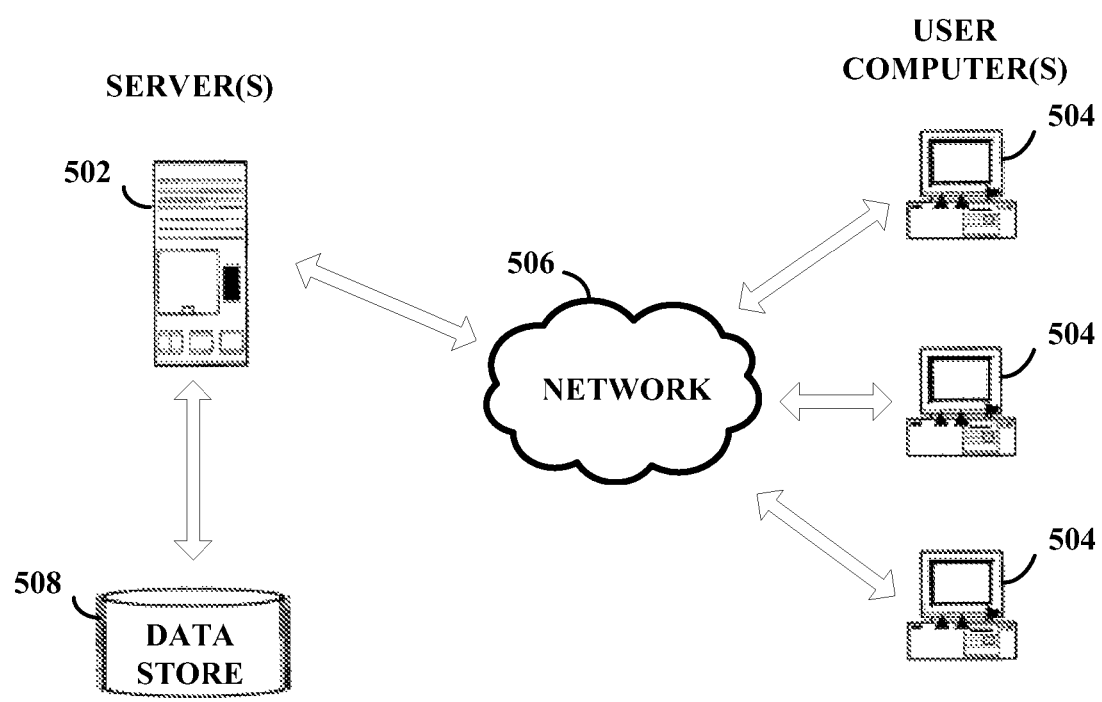
FIG. 5 illustrates some components that can be used in connection with one or more embodiments of the present disclosure.

FIG. 5 illustrates some components that can be used in connection with one or more embodiments of the present disclosure. In accordance with one or more embodiments of the present disclosure, one or more computing devices 502, e.g., one or more servers, client computing devices 130 or other computing device, are configured to comprise functionality described herein, e.g., functionality described in accordance with one or more of the components shown in FIGS. 1 and 2, and functionality described in accordance with FIGS. 3 and 4.

Computing device 502 can serve content, such as and without limitation web pages, audio and/or video content, etc., to user computers 504 using a browser application, and/or other application, via a network 506. In accordance with one or more embodiments, content item recommendations 136 are served to user computers 504, e.g., as part of a web page served by computing device 502. Data store 508 can be used to store data including without limitation content items 104, topic model 108, content-topic relationships 110, short and long term browsing histories or interest profiles, etc., program code to configure at least one server 502 to execute functionality in accordance with one or more embodiments of the present disclosure, etc.

The user computer 504 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computer 504 can include one or more processors, memory, a removable media reader, network interface, display and interface, and one or more input devices, e.g., keyboard, keypad, mouse, etc. and input device interface, for example. One skilled in the art will recognize that server 502 and user computer 504 may be configured in many different ways and implemented using many different combinations of hardware, software, or firmware.

In accordance with one or more embodiments, a computing device 502 can make a user interface, such as and without limitation one or more interview screens or web pages and/or one or more screens containing recommendations, available to a user computer 504 via the network 506. In accordance with one or more embodiments, computing device 502 makes a user interface available to a user computer 504 by communicating a definition of the user interface to the user computer 504 via the network 506. The user interface definition can be specified using any of a number of languages, including without limitation a markup language such as Hypertext Markup Language, scripts, applets and the like. The user interface definition can be processed by an application executing on the user computer 504, such as a browser application, to output the user interface on a display coupled, e.g., a display directly or indirectly connected, to the user computer 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 5. Alternatively, embodiments of the present disclosure can be implemented other environments, e.g., a peer-to-peer environment as one non-limiting example.

Figure 6:
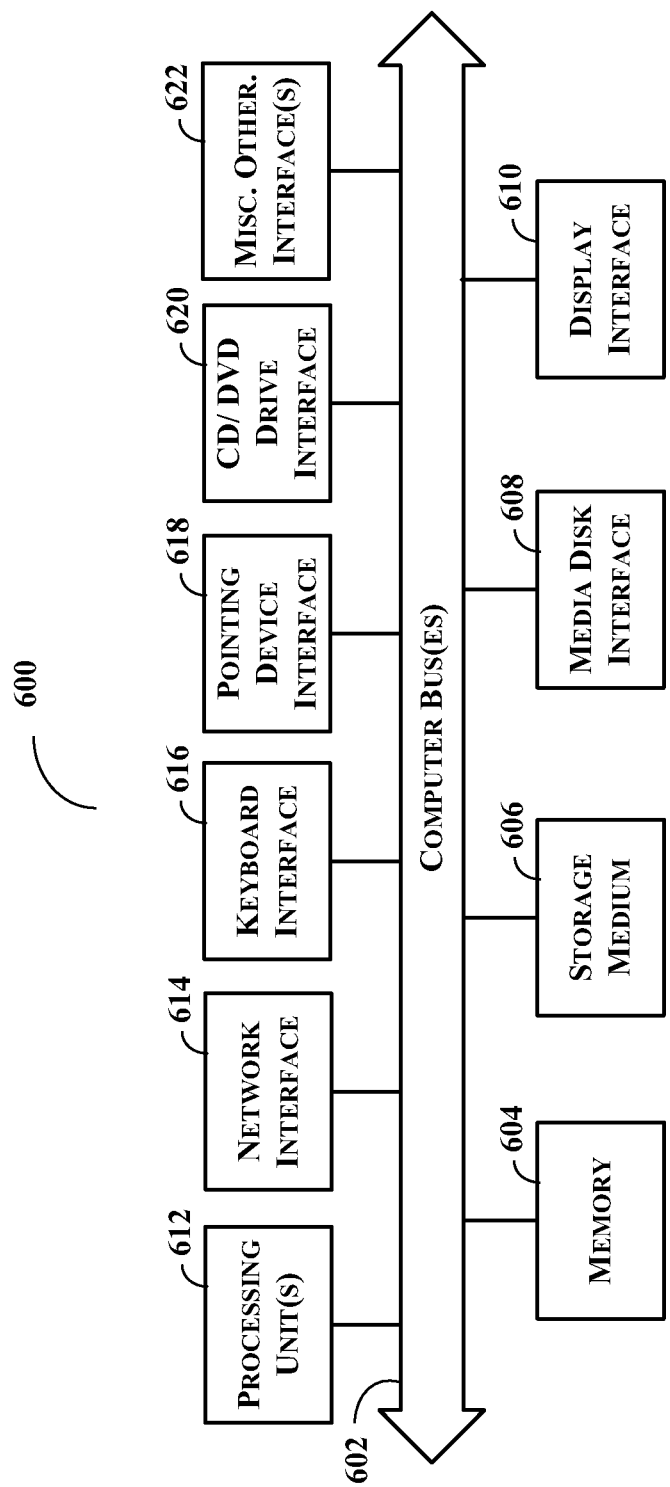
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 602 or user computer 604, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 608 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
    relating, using at least one computing system, each content item in a plurality of content items with a plurality of content item topics, each content item having a plurality of relevance values corresponding to the plurality of content item topics, each relevance value reflecting a strength of relationship between a topic of the plurality of content item topics and the content item;
    identifying, using the at least one computing system, topics of interest to a user, the topics of interest being identified for the user from a content item browsing history of the user, each identified topic of interest corresponding to a topic of the plurality of content item topics and having a level of interest that exceeds a predefined user-interest threshold;
    identifying, using the at least one computing system, a set of content items as recommendations for the user by iterating through the topics of interest to the user to identify the set of content items, each content item in the set having a relevance determined using the strength of relationship between the topic of the plurality of content item topics and the content item; and
    ranking, using the at least one computing system, the set of content items based on the determined relevance of each content item in the set.

2. The method of claim 1, further comprising:
    identifying, for each content item in the plurality of content items, each topic's relevance to the content item using a topic model and token occurrences in the content item, the topic model identifying a probabilistic correspondence between token occurrences and the plurality of content item topics.

3. The method of claim 2, further comprising:
    generating a vector for each content item in the plurality of content items, a content item's vector identifying the content item and, for each topic in the plurality of content item topics, the relevance of the topic to the content item.

4. The method of claim 3, the content item browsing history of the user comprising a short term browsing history identifying a content item most recently accessed by the user and a long term browsing history identifying one or more content items accessed by the user within a predefined time window, the method further comprising:
    determining each topic's relevance by:
        adding, for each of the one or more content items identified in the long term browsing history, a weighted relevance of the topic to the content item to an aggregate relevance of the topic, the weighted relevance being determined using the topic's relevance to the content item and a weighting that is based on a time associated with the content item;
        combining the topic's aggregate relevance with a relevance of the topic to the content item identified in the short term browsing history to form a combined relevance for the topic.

5. The method of claim 4, further comprising:
    determining, for each topic having a combined relevance, whether the user's interest in the topic is significant by comparing the topic's combined relevance with the user-interest threshold; and
    for each topic determined to be of significant interest to the user, using the topic to perform a per interest retrieval, the per interest retrieval retrieving content items in the plurality of content items that have a relationship with the topic;
    grouping any remaining topics, and performing a group interest retrieval to retrieve content items in the plurality of content items, each content item retrieved via the group interest retrieval having a relationship with all of the grouped topics.

6. The method of claim 5, further comprising:
    identifying a relevance of a content item retrieved using the topic to perform a per interest retrieval to be the relevance value reflecting the strength of relationship between the topic and the content item; and
    identifying a relevance of a content item retrieved in a group interest retrieval using the remaining topics, the identified relevance being identified using a cosine similarity between the remaining topics' relevance values, each relevance value corresponding to one of the remaining topics and reflecting the strength of relationship between the remaining topic and the content item.

7. The method of claim 5, the ranking further comprising:
    ranking the retrieved content item in order of each content item's identified relevance.

8. A system comprising:
    at least one processor and memory, the memory storing instructions that when executed by the at least one processor cause the at least one processor to:
        relate each content item in a plurality of content items with a plurality of content item topics, each content item having a plurality of relevance values corresponding to the plurality of content item topics, each relevance value reflecting a strength of relationship between a topic of the plurality of content item topics and the content item;
        identify topics of interest to a user, the topics of interest being identified for the user from a content item browsing history of the user, each identified topic of interest corresponding to a topic of the plurality of content item topics and having a level of interest that exceeds a predefined user-interest threshold;
        identify a set of content items as recommendations for the user by iterating through the topics of interest to the user to identify the set of content items, each content item in the set having a relevance determined using the strength of relationship between the topic of the plurality of content item topics and the content item; and
        rank the set of content items based on the determined relevance of each content item in the set.

9. The system of claim 8, further comprising instructions that when executed by the at least one processor cause the at least one processor to:

identify, for each content item in the plurality of content items, each topic's relevance to the content item using a topic model and token occurrences in the content item, the topic model identifying a probabilistic correspondence between token occurrences and the plurality of content item topics.

10. The system of claim 9, further comprising instructions that when executed by the at least one processor cause the at least one processor to:
generate a vector for each content item in the plurality of content items, a content item's vector identifying the content item and, for each topic in the plurality of content item topics, the relevance of the topic to the content item.

11. The system of claim 10, the content item browsing history of the user comprising a short term browsing history identifying a content item most recently accessed by the user and a long term browsing history identifying one or more content items accessed by the user within a predefined time window, the system further comprising instructions that when executed by the at least one processor cause the at least one processor to:
determine each topic's relevance by:
adding, for each of the one or more content items identified in the long term browsing history, a weighted relevance of the topic to the content item to an aggregate relevance of the topic, the weighted relevance being determined using the topic's relevance to the content item and a weighting that is based on a time associated with the content item;
combining the topic's aggregate relevance with a relevance of the topic to the content item identified in the short term browsing history to form a combined relevance for the topic.

12. The system of claim 11, further comprising instructions that when executed by the at least one processor cause the at least one processor to:
determine, for each topic having a combined relevance, whether the user's interest in the topic is significant by comparing the topic's combined relevance with the user-interest threshold; and
for each topic determined to be of significant interest to the user, use the topic to perform a per interest retrieval, the per interest retrieval retrieving content items in the plurality of content items that have a relationship with the topic;
group any remaining topics, and perform a group interest retrieval to retrieve content items in the plurality of content items, each content item retrieved via the group interest retrieval having a relationship with all of the grouped topics.

13. The system of claim 12, further comprising instructions that when executed by the at least one processor cause the at least one processor to:
identify a relevance of a content item retrieved using the topic to perform a per interest retrieval to be the relevance value reflecting the strength of relationship between the topic and the content item; and
identify a relevance of a content item retrieved in a group interest retrieval using the remaining topics, the identified relevance being identified using a cosine similarity between the remaining topics' relevance values, each relevance value corresponding to one of the remaining topics and reflecting the strength of relationship between the remaining topic and the content item.

14. The system of claim 13, the instructions that when executed by the at least one processor cause the at least one processor to rank further comprising instructions that when executed by the at least one processor cause the at least one processor to:
rank the retrieved content item in order of each content item's identified relevance.

15. A computer readable storage media for tangibly storing thereon computer readable instructions that when executed, cause at least one processor to:
relate each content item in a plurality of content items with a plurality of content item topics, each content item having a plurality of relevance values corresponding to the plurality of content item topics, each relevance value reflecting a strength of relationship between a topic of the plurality of content item topics and the content item;
identify topics of interest to a user, the topics of interest being identified for the user from a content item browsing history of the user, each identified topic of interest corresponding to a topic of the plurality of content item topics and having a level of interest that exceeds a predefined user-interest threshold;
identify a set of content items as recommendations for the user by iterating through the topics of interest to the user to identify the set of content items, each content item in the set having a relevance determined using the strength of relationship between the topic of the plurality of content item topics and the content item; and
rank the set of content items based on the determined relevance of each content item in the set.

16. The media of claim 15, further comprising instructions that when executed by the at least one processor cause the at least one processor to:
identify, for each content item in the plurality of content items, each topic's relevance to the content item using a topic model and token occurrences in the content item, the topic model identifying a probabilistic correspondence between token occurrences and the plurality of content item topics.

17. The media of claim 16, further comprising instructions that when executed by the at least one processor cause the at least one processor to:
generate a vector for each content item in the plurality of content items, a content item's vector identifying the content item and, for each topic in the plurality of content item topics, the relevance of the topic to the content item.

18. The media of claim 17, the content item browsing history of the user comprising a short term browsing history identifying a content item most recently accessed by the user and a long term browsing history identifying one or more content items accessed by the user within a predefined time window, the system further comprising instructions that when executed by the at least one processor cause the at least one processor to:
determine each topic's relevance by:
adding, for each of the one or more content items identified in the long term browsing history, a weighted relevance of the topic to the content item to an aggregate relevance of the topic, the weighted relevance being determined using the topic's relevance to the content item and a weighting that is based on a time associated with the content item;
combining the topic's aggregate relevance with a relevance of the topic to the content item identified in the short term browsing history to form a combined relevance for the topic.

19. The media of claim 18, further comprising instructions that when executed by the at least one processor cause the at least one processor to:
- determine, for each topic having a combined relevance, whether the user's interest in the topic is significant by comparing the topic's combined relevance with the user-interest threshold; and
- for each topic determined to be of significant interest to the user, use the topic to perform a per interest retrieval, the per interest retrieval retrieving content items in the plurality of content items that have a relationship with the topic;
- group any remaining topics, and perform a group interest retrieval to retrieve content items in the plurality of content items, each content item retrieved via the group interest retrieval having a relationship with all of the grouped topics.

20. The media of claim 19, further comprising instructions that when executed by the at least one processor cause the at least one processor to:
- identify a relevance of a content item retrieved using the topic to perform a per interest retrieval to be the relevance value reflecting the strength of relationship between the topic and the content item; and
- identify a relevance of a content item retrieved in a group interest retrieval using the remaining topics, the identified relevance being identified using a cosine similarity between the remaining topics' relevance values, each relevance value corresponding to one of the remaining topics and reflecting the strength of relationship between the remaining topic and the content item.

21. The media of claim 20, the instructions that when executed by the at least one processor cause the at least one processor to rank further comprising instructions that when executed by the at least one processor cause the at least one processor to:
- rank the retrieved content item in order of each content item's identified relevance.

* * * * *